Sept. 20, 1960  S. R. MITICK, JR  2,953,664
THERMOSTATIC SWITCH
Filed March 3, 1958  2 Sheets-Sheet 1

INVENTOR.
STANLEY R. MITICK JR.
BY Martin Kalikow
ATTORNEY

Sept. 20, 1960  S. R. MITICK, JR  2,953,664
THERMOSTATIC SWITCH

Filed March 3, 1958  2 Sheets-Sheet 2

*INVENTOR.*
STANLEY R. MITICK JR.
BY Martin Kalikow
ATTORNEY

United States Patent Office 2,953,664
Patented Sept. 20, 1960

2,953,664
THERMOSTATIC SWITCH

Stanley R. Mitick, Jr., Morrison, Ill., assignor to General Electric Company, a corporation of New York Filed Mar. 3, 1958, Ser. No. 718,602

5 Claims. (Cl. 200—122)

My invention relates to thermostatic switches and particularly to room thermostats such as are used for controlling domestic heating and air conditioning systems, although certain of the improvements of the present invention may be useful in other types of condition responsive control devices.

Room thermostats, such as that disclosed in Patent No. 2,587,351, Manning and assigned to the assignee of the present invention, are well known in the art and have generally provided reliable temperature control. There is considerable structural similarity between the mechanism utilized by the aforementioned Manning patent and that disclosed in the present application and reference will be made to this structure throughout the subsequent description.

It is well known that room temperature rise and fall in response to a temperature-controlled heating system is relatively sluggish and that this inertia effect has been found to produce objectionable temperature lag or overshoot when the room temperature is allowed to depend solely upon the temperature effect on a thermostat bimetal. To correct this problem, it has become common practice to provide temperature anticipation within the thermostat by adding additional heat to the bimetal above and beyond that produced by the slowly rising room temperature. Thus, the heating plant will be given an "off" signal before the room temperature actually reaches the desired temperature thereby allowing the inertia effect to carry the actual room temperature to that which has been signalled by the thermostat.

Prior art heat anticipating schemes have generally utilized a fixed resistor mounted in close proximity to the bimetal or other temperature sensitive element and connected so that it carries the same current as the bimetal. Such a construction is shown in the aforementioned Manning Patent No. 2,587,351. This resistor dissipates heat which raises the temperature of the air within the thermostat enclosure faster than the actual rate of temperature rise within the room.

However, present day market conditions require that a commercially successful thermostat be compatible with various types of heating equipment which have different response speeds. Thus, it has become common practice to provide resistors having a variety of ratings for use within a single thermostat thereby providing a certain degree of flexibility. Such a system, however, requires that the resistor within the thermostat enclosure be changed whenever it is desired to vary the heat anticipation rate, and further, that the heating system contractor have a variety of such resistors available to accommodate the various heating systems and heat anticipation rates with which he may desire to use the particular thermostat. Even with the necessary resistor available, the problem of heat anticipation is not eliminated. The heat transfer characteristic of the anticipator unit must be predictable and the use of resistors of various sizes and shapes has been found to complicate the problem since their heat conduction and radiation rates vary appreciably with changes in size and location of the resistor relative to the temperature sensitive element.

In addition, with the advent of widespread acceptance of air conditioning, it has become desirable to provide a single room thermostat which is capable of furnishing economical reliable and simple temperature control of both the heating and cooling systems. Such combination devices have in general been complex, bulky, difficult to install, and difficult to service. In general, such a combination device utilizes a single temperature responsive element to control the circuit making and breaking contacts of both the heating and cooling circuits and it, therefore, is necessary to provide that this element be snap acting in both directions and that the snap action thus imparted to the contacts be reliable and easily obtained.

It is therefore an object of this invention to provide a temperature responsive control unit which will reliably and effectively control both heating and cooling units while being low in cost, compact, easily adjustable and attractive in appearance so that it may be conveniently placed within the areas whose temperature is to be controlled.

It is a further object of this invention to provide an improved heat anticipating unit for use within such a thermostat, the heat anticipator being adjustable so as to provide increased flexibility of application and control for the overall thermostatic unit.

It is an additional object of this invention to provide a simple and effective single pole double throw snap acting switch mechanism which will enable a single thermostatic unit to provide effective control for both the heating and cooling units.

In accordance with one feature of my invention, I provide a thermostatic switch having a bimetal actuated temperature responsive switching mechanism mounted on an insulating base wherein the bimetal of the switching mechanism is secured to a frame at one end and carries a contact at its other end. Heat anticipation is provided by a resistor which is mounted in heat conducting relationship with the fixed end of the bimetal. Two fixed contacts are mounted adjacent the free end of the bimetal and in proximity to the movable contact on the bimetal so that single pole double throw switch action is obtained. Snap contact action is provided by a permanent magnet which influences a ferromagnetic extension on the bimetal, and circuit connections are established to the switching mechanism through convenient terminals mounted on the insulating base.

In accordance with another feature of my invention, I provide an adjustable heat anticipator for a room thermostat in which the resistance is a tubular linearly wound wire resistor whose effective resistance is varied by moving a slider along the length of the resistor and whose heat conduction and radiation effects are markedly increased and controlled by the provision of a U shaped heat reflecting conducting member which substantially encloses the resistor along its full length and which has indicia thereon cooperating with the slider to indicate the relative heating effect of the heat anticipator unit.

In accordance with another feature of my invention, I provide a cylindrical permanent magnet fixedly mounted near the free end of the bimetal which cooperates with a ferromagnetic extension on the bimetal. This extension is wrapped around the magnet so as to provide snap action in either direction of bimetal contact movement.

Further objects and advantages of this invention will become apparent and the invention will be better understood by reference to the following description and the accompanying drawings. The features of novelty which characterize this invention will be pointed out with particularity in the claims annexed to and forming a part of this specification.

Figure 1:
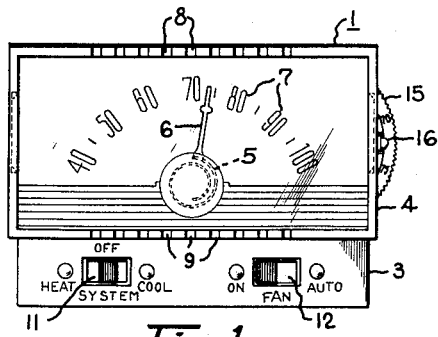
Figure 1 is a front view of an assembled room thermostat control unit.
Figure 3:
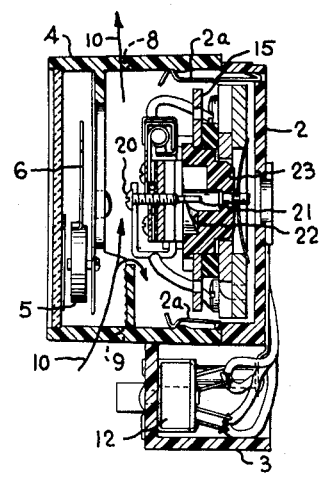
Figure 3 is a side view taken along the lines 3—3 of Figure 2.
Figure 2:
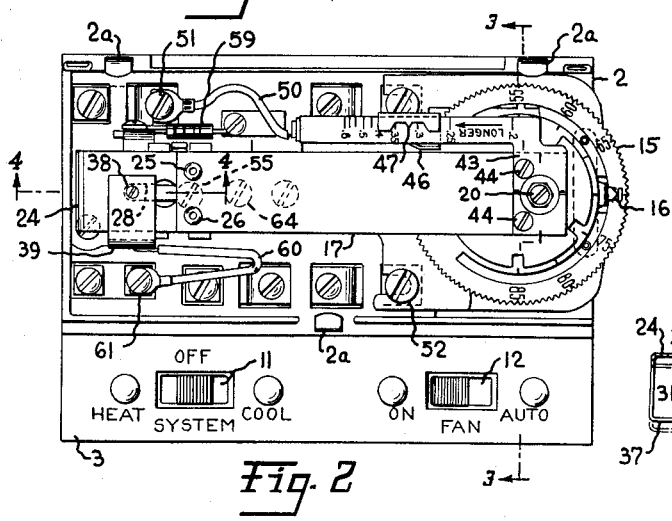
Figure 2 is a front view of a thermostat with the front cover and temperature indicator removed.

Referring now to Figures 1, 2 and 3, it is seen that thermostat 1 generally comprises a mechanism base 2, a switch base 3, and a front cover 4. Front cover 4 is held against base 2 by spring clips 2a and carries coiled bimetal 5 which actuates a pointer 6 that cooperates with temperature markings 7 to indicate the ambient temperature. Slots 8 and 9 in front cover 4 enable air (shown generally by lines 10) to circulate about the bimetal 5 and the temperature control mechanism. The switch base 3 carries a system switch 11 and a fan switch 12 and is secured to the mechanism base 2 by the mounting straps 13 and 14, shown clearly in Figure 5. Extending through a slot in the end of front housing 4 is temperature control dial 15 and cooperating indicator 16.

Figure 6:
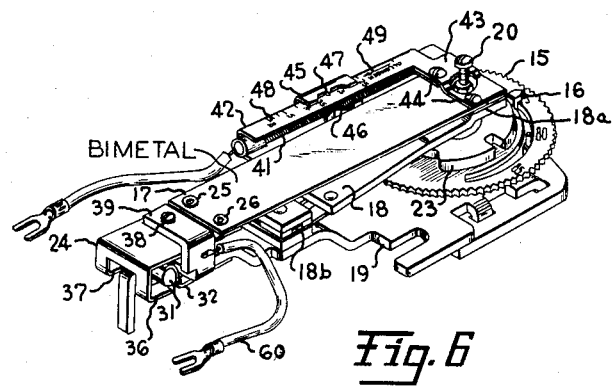
Figure 6 is a perspective view of the thermostatic switching mechanism.

As seen in Figures 2, 3 and 6 and as more fully described in the aforementioned Manning Patent 2,587,351, bimetal element 17 is rigidly fastened to supporting arm 18 which, in turn, is flexibly supported on and electrical insulated from base member 19. Factory adjusted screw 20 is in threaded engagement with supporting arm 18 and has a portion 21 (seen clearly in Figure 3) which engages the cam surface 22 of cam 23. Cam 23 rigidly engages temperature dial 15 and can be rotated by rotation of temperature dial 15 so as to displace end 18a of supporting member 18 relative to base 19.

The free end of bimetal 17 carries a U shaped ferromagnetic member 24 secured to its end by the rivets 25 and 26. As more clearly seen in Figure 4, the bimetal 17 also carries a contact 27 which passes through a slot 28 in the ferromagnetic extension 24. Contact 27 is electrically connected to bimetal 17 by wipe spring 27a and contact 27 presents two contact surfaces 29 and 30, one on each side of the ferromagnetic member 24. This construction allows contact 27 to slide back and forth within and move perpendicularly to the member 24. Such freedom of relative movement between contact 27 and member 24 is desirable, because, as will be described below in conjunction with the description of the snap action of the switch, it allows the spring 27a to improve the snap action. Contact screw 34 is in threaded engagement with base member 19 and is adjustable against the spring 35 which is also held by rivet 33. Upper contact screw 38 is in threaded engagement with arm 39 which is fastened to base 19 by the rivet 33. The insulating shims or disks 40 insulate this contact from the base member 19.

Figure 4:
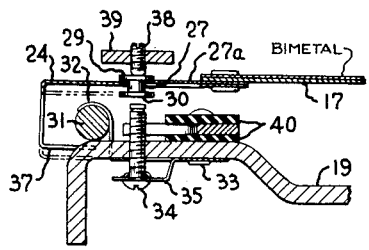
Figure 4 is a cross section of the bimetal and switching contacts taken along the line 4—4 of Figure 2.

Base 19 also supports the cylindrical permanent magnet 31, held in position by clip 32 which is riveted to base 19 at 33. As seen in Figures 4 and 6, ferromagnetic extension 24 has arms 36 and 37 extending down and around magnet 31 thereby presenting an attractive surface above and below magnet 31. The arms 36 and 37 are dimensioned relative to the spacing of contacts 34 and 38 so as to negate the possibility that a dead band of no contact engagement can exist. The spacing "D" (Figure 4) also controls the magnitude of magnetic force exerted in both directions on extension 24.

As described thus far, the mechanism responds to rotation of the temperature control dial 15 by altering the position of the cam surface 22 thereby forcing the adjusting screw 21 away from the frame member 19 and thereby pivoting the bimetal assembly 17 and its supporting arm 18 about the flexible pivot point shown generally at 18b. This pivotal motion attempts to alter the position of the free end of the bimetal and its contact 27 relative to the fixed contacts 34 and 38. This movement, as clearly described in the aforementioned Manning Patent 2,587,351, alters the temperature required to deflect the bimetal into engagement with either contact 34 or contact 38.

It is noted that this point that the permanent magnet 31 exerts a magnetic force upon the ferromagnetic extension 24 of the bimetal 17 so as to attempt to hold it in either one contact position or the other. That is, as seen in Figure 4, the contact is in engagement with the fixed contact 38 and the permanent magnet 31 exerts a stronger magnetic force on the lower portion of the extension 24, namely on members 36 and 37, than it does on the upper portion of that extension. As bimetal 17 attempts to deflect downward, it is restrained in its position shown in Figure 4 until the bimetal force overcomes the magnetic force thereby allowing the contact 27 to snap into engagement with with contact 34. At this point, permanent magnet 31 now exerts a greater force on the upper portion of the ferromagnetic extension 24 and this snap action will be repeated if the bimetal attempts to move the contact back into engagement with the fixed contact 38.

As is well understood by those skilled in the art, the magnetic attraction between magnet 31 and extension 24 will vary as an exponent of the distance separating these members; therefore, when arm 37 of extension 24 (as shown in Fig. 4) first starts to move away from magnet 31 due to the deflecting force of the bimetal 17, it will move at a slower rate than that at which it moves when it is approaching its maximum distance from magnet 31. Of course, once contact 27 starts to move away from contact 38, it is desirable to have it complete this movement as rapidly as possible to prevent excessive arcing between these contacts. By mounting contact 27 on spring 27a, I afford such a rapid opening of contacts 27 and 28 despite the inherent sluggishness in the initial movement of ferromagnetic extension 24. By referring to Fig. 4, it will be seen that spring 27a is under tension when contact 27 is held against either contact 38, as shown, or contact 34. It will also be understood that if contact 27 was not held against either contact 38 or 34, spring 27a would hold the contact 27 in a plane relative to extension 24 such that the surfaces 29 and 30 of contact 27 would be equidistant from the upper portion of extension 24. Therefore, during normal operation of the switch, when extension 24 starts to move away from contact 38, for example, spring 27a will hold contact 27 against contact 38 until extension 24 is midway between surfaces 29 and 30 of contact 27. At this point in its travel, since arm 37 has drawn a considerable distance away from magnet 31, the extension 24 is moving very rapidly toward contact 34 and it will engage the upper side of surface 30 with sufficient force to snap the contact 27 very abruptly away from contact 38 and into engagement with contact 34, thereby improving the snap action of the contact in both its opening and closing action.

As temperature changes to cause deflection of bimetal 17, the force between magnet 31 and extension 24 approaches and then passes through zero before the contact 27 snaps over. If contact 27 were not mounted on wipe spring 27a, there would be a tendency to momentarily open and close the controlled circuit. Deflection of wipe spring 27a is limited by the dimension of the shank between contact surfaces 29 and 30. This deflection is present at the time extension 24 snaps over and thus insures adequate contact pressure as well as preventing contact chatter.

Referring now to Figures 2, 3 and 6, it is seen that uniformly wound wire resistor 41 is supported at its ends and enclosed on all but one side substantially along its entire length by the U shaped metal member 42 which has an outwardly extending portion 43 that is held in electrical and heat conducting relationship with bimetal element 17 by screws 44. Slider 45 is a metallic conducting member which has a bent over portion 46 that flexibly engages the wire turns of the resistor 41. Thus, as slider 45 is moved over the length of the resistor, greater or lesser portions of the resistance are shorted out of the electrical circuit. Slider 45 has a pointer 47 that cooperates with indicia 48 on the surface of the supporting member 42 so as to indicate the current value represented by the position of this slider. The arrow 49 and the designation "longer" which is found on the supporting member 42 merely indicates that as the slider is moved in the direction of increasing numeral designation, the running time of the heat source controlled by the thermostat will be increased.

Since the purpose in providing the adjustable resistor 41 is primarily to facilitate system installation, the member 42 is provided with a scale calibrated in amperes within the range of common variation in the existing gas and oil burner control circuit current. Applicant's invention enables the scale on member 42 to have non-linear markings at which the uniform linear wire wound resistor 41 dissipates equal watts rather than requiring use of a special and expensive non-linear resistance which would use linear scale markings. The long and narrow shape of the resistor 41 enables a long scale to be used thereby facilitating placement and reading of the scale.

Placement of the resistor 41 with respect to bimetal 17 is also a critical consideration not only from the physical design standpoint but also for the proper thermal effect of resistor heat on the bimetal. Prior experience indicated that rapid transfer of heat from the resistor to the bimetal was desirable as was low temperature rise in the bimetal itself over long periods of operation. This latter requirement is realized because the control point of the thermostat is lower on cold days when a long running period of a heating system causes excessive temperature rise in the bimetal. Anticipating resistor 41 is located in the long narrow space between the bimetal 17 and the thermostat cover wall and is contained in a metal channel 42 which provides not only an excellent heat conductive path to the bimetal but also enables heat transfer to be provided by radiation from the inner surface of the U shaped member. Applicant's construction and placing of the anticipating resistor assembly provides that most of the heat transfer is obtained by conduction thereby achieving a minimum total temperature rise of bimetal 17 and proper heat transfer rate to provide proper heat anticipation.

Figure 5:
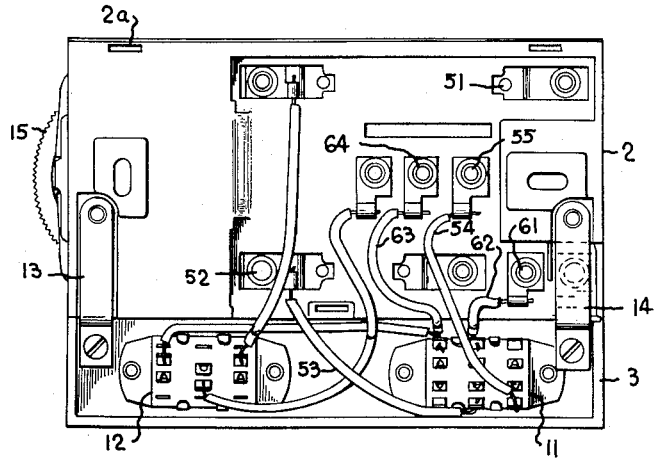
Figure 5 is a rear view of the thermostat.
Figure 7:
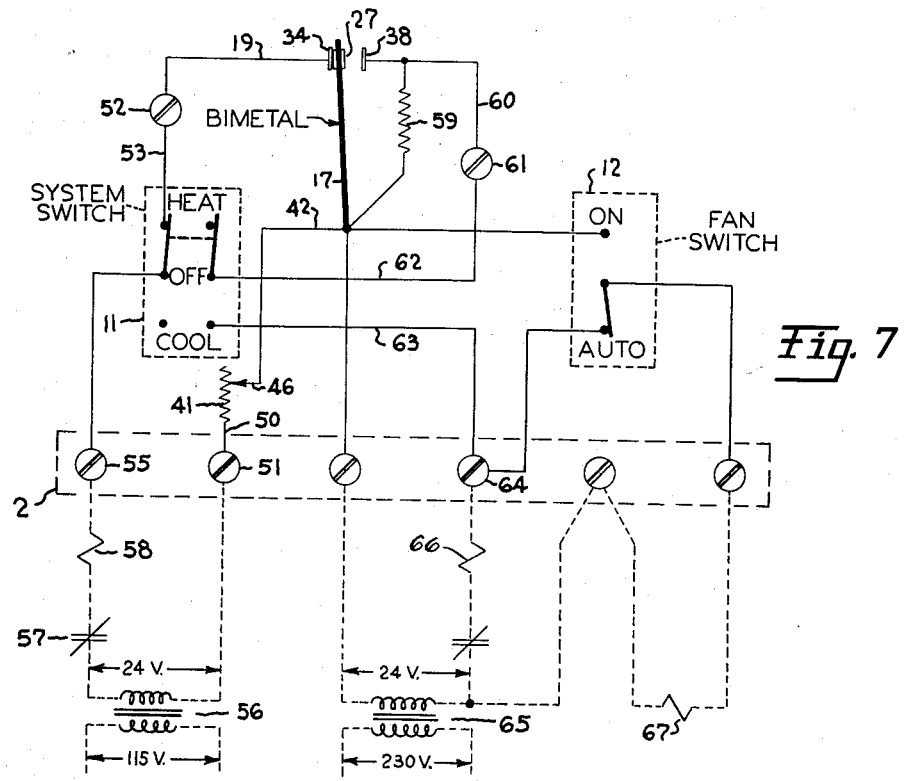
Figure 7 is a schematic diagram of the thermostat and its associated electrical circuits.

Referring now to the drawings in general and in particular to Figures 5 and 7, it is seen that system switch 11 provides a "Heat" position, an "Off" position and a "Cool" position. As shown in Figure 7, when the system switch 11 is in the heat position, one end of the bimetal 17 is connected through the heat conducting member 42 and the slider 46 to the anticipating resistor 41 and then through lead 50 to terminal 51 on the insulating base 2. As shown in Figure 7, the bimetal is deflected into contact with contact 34 which is electrically connected through frame member 19 to terminal screw 52 which is back connected through wire 53 to the System Control Switch 11. Wire 54 (Figure 5) connects the other side of the "Heat" position of the switch 11 to the terminal 55. As further seen in Figure 7, the circuit just described can be energized through a transformer 56 having a 115 volt primary and a 24 volt secondary. A safety pilot switch 57 and a gas valve heating relay 58 are placed in series circuit relationship with the just described control circuit. Thus, as the bimetal closes against contact 34, the relay coil 58 will be energized if the safety pilot switch is in its normally closed position.

If the bimetal is deflected in the opposite direction to that shown in Figure 7, and if the system switch is in the cool position, the contact 27 on the bimetal will engage the contact 38 thereby placing the fixed value cooling anticipator resistor 59 (shown clearly in Figure 2) in parallel with the bimetal 17. When shunted by bimetal 17, resistor 59 is not heated but, when contacts 27 and 38 open, the resistor 59 will be heated and will maintain the temperature of the bimetal 17 several degrees above room temperature, thereby causing the contacts 27 and 38 to close again in anticipation of a desired room temperature before the air in the room actually reaches this desired value. Closing of the contacts also closes the circuit from contact 38 through wire 60 to terminal 61. Terminal 61 is back connected by wire 62 to the system switch 11, which, when in its cool position, connects contact 38 through wire 60, terminal 61, wire 62, wire 63 to terminal 64. Thus, with an external circuit as shown in Figure 7, the primary voltage of 230 volts is applied to transformer 65 thereby energizing the secondary with 24 volts so that the circuit is complete through contact 38 and the system switch so as to energize cooling contactor coil 66. At the same time, if fan switch 12 is in the "Auto" position, the fan relay coil 67 will be energized.

It is thus seen that I have provided a thermal switch capable of providing reliable and efficient heating and cooling control while being constructed so as to be easily incorporated within a small enclosure of attractive appearance. I have also provided an improved switching mechanism providing single pole double throw action with snap action for the contacts in both directions of operation. Additionally, I have provided an easily adjustable heat anticipator for a room thermostat that functions in a reliable and simple manner and which is compact and economical to manufacture.

Although I have described a particular embodiment of my invention, it is apparent that many modifications may be made. It is to be understood that I intend, by the appended claims, to cover all such modifications that fall within the true spirit and scope of the invention.

What I claim as new and desire to secure by Letters Patent of the United States is:

1. A thermostatic switch comprising an insulating base, a temperature responsive switching mechanism mounted on said base, said switching mechanism including a frame, a bimetal having one end secured to and insulated from said frame and its other end free to move in response to temperature changes, a magnet mounted on said frame adjacent to the free end of said bimetal, a ferromagnetic extension secured to the free end of said bimetal and shaped to extend around said magnet, a variable resistance, means for mounting said resistance in heat and electrical conducting relation with said bimetal, a first contact secured adjacent to the free end of said bimetal and extending through said bimetal so as to present a contact surface on each side of said bimetal, a second contact secured to and insulated from said frame and positioned to be engaged by said first contact upon deflection of said bimetal in a first direction, a third contact secured to said frame and positioned to be engaged by said first contact upon deflection of said bimetal in a second direction, means for individually establishing electrical connection to said resistor, to said frame, and to said second contact.

2. A temperature responsive switching mechanism comprising a frame, a long flat bimetal having one end secured to and insulated from said frame and its other end free to move in response to temperature changes, a permanent magnet mounted on said frame adjacent to the free end of said bimetal, a ferromagnetic extension secured to the free end of said bimetal and shaped to extend around said magnet, a resistor, means for mounting said resistance in heat and electrical conducting relation with said bimetal at its secured end, means for varying the effective resistance of said resistor, a first contact secured adjacent to the free end of said bimetal and extending through said bimetal so as to present a contact surface on each side of said bimetal, a second contact secured to and insulated from said frame and positioned to be engaged by said first contact upon deflection of said bimetal under increasing heat conditions, a third contact secured to said frame and positioned to be engaged by said first contact upon deflection of said bimetal under decreasing heat conditions, and means for individually establishing electrical connections to said resistor, said frame, and said second contact.

3. A temperature responsive switching mechanism comprising a frame, a bimetal strip having one end secured to and insulated from said frame and its other end free to move in response to temperature changes, a permanent magnet mounted on said frame adjacent to the free end of said bimetal and having its axis transverse to the longitudinal axis of said bimetal, a ferromagnetic extension secured to the free end of said bimetal and shaped to extend around at least 180° of the circumference of said magnet, a uniformly wound wire resistor, means for mounting said resistor in heat and electrical conducting relationship with the secured end of said bimetal, said mounting means extending along the full length of said resistor and having a U shaped cross section which opens adjacent to said bimetal, a slider mounted on said mounting means and in engagement with the resistor, indicia on said mounting means cooperating with said slider so as to indicate resistor current, a first contact flexibly secured to the free end of said bimetal and extending through said bimetal so as to present a contact surface on each side of said bimetal, a second contact secured to and insulated from said frame and positioned to be engaged by said first contact upon deflection of said bimetal under increasing heat conditions, a third contact secured to said frame and positioned to be engaged by said first contact upon a decreasing heat condition, and terminal means for establishing electrical connection to said resistor, said frame, and said second contact.

4. The means for imparting snap action to the movable contact of a double throw switch comprising a switch frame, a long flat bimetallic switch element having one end secured to said frame, a spring secured to the bimetallic switch element adjacent the free end thereof, a first contact secured to the free end of said spring, a second contact positioned to be engaged by the first contact upon deflection of the switch element in a first direction, a third contact positioned to be engaged by said first contact upon deflection of said switch element in a second direction, means for deflecting the switch element in said first and second directions, a cylindrical magnet rigidly mounted adjacent the movable end of the switch element, a ferromagnetic extension supported by the free end of said switch element, said extension shaped relative to the spacing between said second and third contacts and surrounding said magnet on at least three sides so as to exert a continuous magnetic biasing force upon said switch element in either of two opposite directions thereby enabling the switch element to produce a snap opening and closing action between the first contact and the second and third contacts.

5. A thermosensitive switch comprising a frame, a bimetallic element having one end secured to and insulated from said frame and its other end free to move in response to temperature changes, a variable resistance, a constant resistance, means for mounting said resistances in heat and electrical conducting relation with the bimetallic element, a first contact secured to said bimetallic element adjacent the free end thereof, a second contact positioned to be engaged by said first contact upon deflection of the bimetallic element in a first direction, a third contact positioned to be engaged by the first contact upon deflection of the bimetallic element in a second direction, a first manual switch, a second manual switch, means for synchronizing the operation of said manual switches, a first pair of electrical terminals adapted for connection to the control circuit of a heating system, a second pair of electrical terminals adapted for connection to the control circuit of a cooling system, said heating and cooling systems each having a separate power source for electrical energization thereof, means for electrically connecting the second contact through the first manual switch to one of the terminals of the first pair of terminals, means for electrically connecting the other terminal of said first pair of terminals through the variable resistance to the bimetallic element, means for electrically connecting the third contact through the second manual switch to one terminal of the second pair of terminals, and means for electrically connecting the other terminal of the second pair of terminals to the bimetallic element and through the fixed resistance to the third contact, whereby a temperature anticipating thermal responsive control utilizing a single bimetallic element is provided for regulating the operation of both a heating and a cooling system.

References Cited in the file of this patent

UNITED STATES PATENTS

| 2,067,745 | Williams | Jan. 12, 1937 |
| 2,092,327 | Persons | Sept. 7, 1937 |
| 2,145,722 | Hall | Jan. 31, 1939 |
| 2,236,282 | Ayers | Mar. 25, 1941 |
| 2,236,402 | Gomersall | Mar. 25, 1941 |
| 2,250,135 | Lindemann | July 22, 1941 |
| 2,493,899 | Prouty | Jan. 10, 1946 |
| 2,550,546 | Flight et al. | Apr. 24, 1951 |
| 2,587,351 | Manning | Feb. 26, 1952 |
| 2,855,484 | Kreuter | Oct. 7, 1958 |

FOREIGN PATENTS

| 118,097 | Switzerland | Dec. 16, 1926 |